(No Model.)

C. W. PIERCE.
KETTLE.

No. 418,340. Patented Dec. 31, 1889.

Witnesses:
E. C. Perkins.
W. J. Morgan

Inventor,
Chas. W. Pierce.
By A. P. Thayer,
atty.

UNITED STATES PATENT OFFICE.

CHARLES W. PIERCE, OF ROCKY HILL, CONNECTICUT.

KETTLE.

SPECIFICATION forming part of Letters Patent No. 418,340, dated December 31, 1889.

Application filed September 30, 1886. Serial No. 214,939. (No model.)

*To all whom it may concern:*

Be it known that I, CHARLES W. PIERCE, of Rocky Hill, Hartford county, Connecticut, have invented a new and useful Improvement in Kettles, of which the following is a specification.

My invention relates to kettles made of cast metal for boiling purposes generally and for cooking; and it consists of an improved contrivance of a handle to the side of the kettle for convenience in tilting up the kettle to pour out the water, as hereinafter fully described, reference being made to the accompanying drawings, in which—

Figure 1:
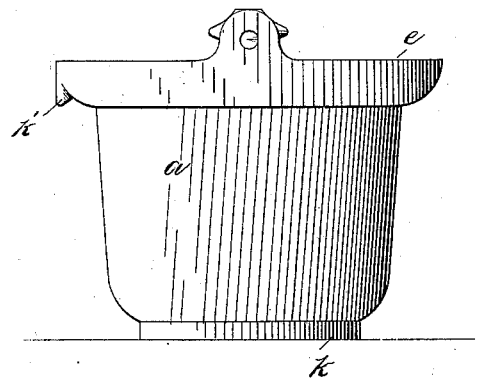
Figure 2:
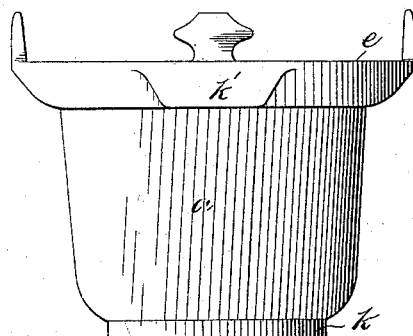
Figure 3:
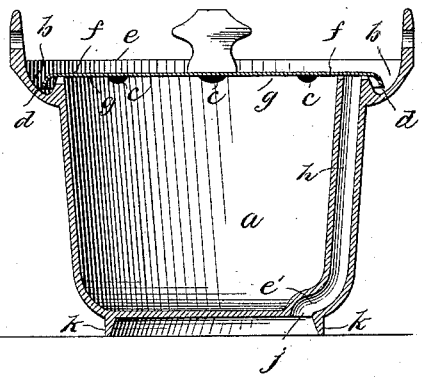

Figures 1 and 2 are side elevations. Fig. 3 is a sectional elevation.

I construct the kettle $a$ with an annular trough $b$ surrounding the top, whereof the outer wall or side of the trough is formed by an outwardly and upwardly projecting flange $e$, cast together with and formed on the outside and rising from a suitable distance below the top of the kettle itself to a greater height than said top, and the inner wall is formed by the upper part $g$ of said top, and is made with notches $c$ or not, as preferred, which notches, when used, extend only partly as deep as the trough, so that said trough will hold water for a water seal to prevent the escape of steam and odors, the rest of the seal consisting of a flange $d$, which I make on the cover $f$ in suitably downward projecting form to extend into the water when the cover rests on the top of wall $g$, and thus effectually stop off the escape of vapors from the kettle. If notches $c$ are used in wall $g$, flange $d$ must extend into the trough lower than the notches. It will be seen that any excess of water forced into the trough by the effect of boiling will cool and settle therein and then flow back into the kettle, so as to effectually prevent boiling over. Together with this water seal I construct the steam-outlet $h$ for the escape of the steam from under the cover by coring it along the inner surface of the kettle with a curved extension $i$, reaching along the bottom of the kettle to an opening $j$, located in said bottom within the circular flange or leg $k$ of the pot, which is sufficiently large to inclose the largest pot-hole of common use in the stove-cover, so that whatever size of pot-hole within the common range may be used the steam will be discharged into the fire, and thus the steam with all the odors issuing from the kettle will be effectually disposed of in the fire and excluded from the room, in which the air will remain sweet and pure.

I utilize the flange $e$ of the trough for the application of the side handle $k'$ to be used in turning up the kettle for pouring out the contents by casting said handle in the form of a downwardly-projecting flange from and flush with the outer extremity of said trough-flange without lateral projection beyond the trough-flange. The handle is in this form protected by the trough-flange from being broken by shocks to which it would be exposed if projecting beyond said trough-flange, and the kettles pack better for storage and shipment.

I am aware that a kettle has been made with a handle projecting outwardly from one side; but I only claim such handle when formed on the outwardly-projecting rib of the top inclosing the trough of the water seal for the cover and projecting directly downward therefrom and without greater projection radially than the rest of the top of the kettle. I do not claim the water seal nor the device for the escape of steam through the bottom of the kettle.

What I claim, and desire to secure by Letters Patent, is—

In a kettle having the trough-flange surrounding and outwardly projecting from the top of the kettle, the handle $k'$, formed on said flange flush with but projecting downwardly and without radial projection beyond said trough-flange, substantially as described.

In witness whereof I have hereunto signed my name in presence of two witnesses.

CHARLES W. PIERCE.

Witnesses:
W. J. MORGAN,
S. H. MORGAN.